United States Patent
Bebernes et al.

(10) Patent No.: US 8,925,672 B2
(45) Date of Patent: Jan. 6, 2015

(54) STEERING CONTROL SYSTEM FOR HYDROSTATICALLY DRIVEN FRONT VEHICLE GROUND WHEELS AND STEERABLE REAR CASTER WHEELS

(71) Applicant: Deere & Company, Moline, IL (US)

(72) Inventors: Thomas D. Bebernes, Ottumwa, IA (US); Stephen E. O'Brien, Ottumwa, IA (US)

(73) Assignee: Deere & Company, Moline, IL (US)

( * ) Notice: Subject to any disclaimer, the term of this patent is extended or adjusted under 35 U.S.C. 154(b) by 141 days.

(21) Appl. No.: 13/681,626

(22) Filed: Nov. 20, 2012

(65) Prior Publication Data
US 2014/0138165 A1 May 22, 2014

(51) Int. Cl.
*B62D 5/09* (2006.01)
*B62D 11/04* (2006.01)
*B62D 5/093* (2006.01)
*B62D 11/00* (2006.01)

(52) U.S. Cl.
CPC ............... *B62D 11/04* (2013.01); *B62D 5/093* (2013.01); *B62D 11/005* (2013.01)
USPC ........... 180/403; 180/414; 180/417; 180/422; 180/415; 180/6.3

(58) Field of Classification Search
CPC ............ B62D 5/09; B62D 5/06; B62D 5/065; B62D 5/075
USPC ........... 180/403, 414, 417, 422, 415, 420, 6.3
See application file for complete search history.

(56) References Cited

U.S. PATENT DOCUMENTS

| | | | |
|---|---|---|---|
| 5,649,606 A | 7/1997 | Bebernes et al. | |
| 5,953,978 A | 9/1999 | Boher et al. | |
| 6,285,936 B1 | 9/2001 | Boher et al. | |
| 7,913,800 B2 | 3/2011 | Graeve et al. | |

(Continued)

FOREIGN PATENT DOCUMENTS

| | | |
|---|---|---|
| RU | 2420421 C2 | 6/2011 |
| RU | 2488261 C2 | 7/2013 |

OTHER PUBLICATIONS

Eurasian Search Report issued in counterpart application No. 201301179, dated May 5, 2014 (2 pages).

*Primary Examiner* — Joseph M Rocca
*Assistant Examiner* — Marlon Arce

(57) ABSTRACT

An integrated steering control system includes a primary, automatic and rear control valves. A steering wheel operates the primary steering control valve and is of a type which includes a leakage characteristic. Steering wheel movement is sensed and a signal is sent which results in the automatic steering control valve being operated for adding fluid that supplied to a steering cylinder by the primary steering control valve in order to compensate for leakage, the amount of added fluid being a function of vehicle ground speed. An electric actuator with position feedback is used for ground speed control. Whenever the actuator position shows that the ground speed is set to zero and a switch in the hydro-handle slot shows that the handle is in the Park position, the automatic steering control valve is activated to move the steering cylinder to a neutral, straight ahead position, as determined by a sensor in a mechanical linkage of the steering control.

4 Claims, 4 Drawing Sheets

(56) References Cited

U.S. PATENT DOCUMENTS

| | | |
|---|---|---|
| 7,918,304 B2 | 4/2011 | Perry et al. |
| 2006/0149446 A1 | 7/2006 | Nelson |
| 2007/0017712 A1 | 1/2007 | Dunn |
| 2008/0116001 A1 | 5/2008 | Graeve et al. |
| 2009/0152828 A1 | 6/2009 | Bebernes et al. |
| 2010/0111712 A1 | 5/2010 | Rotole et al. |
| 2010/0228439 A1* | 9/2010 | Nakamura et al. ............. 701/41 |
| 2011/0297473 A1* | 12/2011 | Krahn ......................... 180/422 |

* cited by examiner

STEERING CONTROL SYSTEM FOR HYDROSTATICALLY DRIVEN FRONT VEHICLE GROUND WHEELS AND STEERABLE REAR CASTER WHEELS

FIELD OF THE INVENTION

The present invention relates to vehicles having hydrostatically driven front wheels and hydraulically steerable rear wheels and more specifically relates to an integrated steering control system for such vehicles.

BACKGROUND OF THE INVENTION

Agricultural machinery is operated under a variety of conditions. As these conditions change, it may be desirable to change the sensitivity of the steering. Steering valves are available with dual displacements, for example, to provide a selectable steering rate. The rate could be selectable as an operator preference or could be automatically selected as a function of a condition such as transmission gear selection or travel speed.

A variable steering rate would be particularly advantageous on a windrower. The dual path hydrostatic drive typically used on windrowers gives them unique handling characteristics. Operator preferences for steering rate vary considerably and may change as driving experience is gained. In addition, because the rate of wheel speed change (the speed of one wheel increases while the speed of the other wheel decreases) used for steering is relatively constant throughout the available range of ground speeds, the effective steering rate changes with ground speed. It may be desirable to optimize this inherent steering rate change. Lastly, it may be possible to enhance the steering if the rate could be electronically controlled. For example, it may be desirable to have a slightly faster steering rate at turn initiation to help overcome the inertial resistance to turn inherent in the dual path hydrostatic transmission steering arrangement.

Variable steering and all of its advantages are readily available on a windrower with an electro-hydraulic (EH) controlled ground drive. Components are readily available but such a steer-by-wire system has the disadvantage of requiring a level of redundancy to comply with safety expectations. This redundancy adds cost and complexity.

One type of primary steering valve that is widely used and therefore cost effective is steering wheel controlled and includes a spool located within a sleeve used together with a fluid meter. One drawback of this known type of primary steering valve is that internal leakage is a characteristic of these valves, with leakage resulting in lost fluid output impacting steering responsiveness under some operating conditions. While this leakage characteristic can be overcome by selecting a larger valve so that the necessary volume of fluid for the desired steering responsiveness or rate is provided by the valve, this solution would require larger volume components with added costs and space challenges for the entire system.

Thus, what is desired is a relatively simple and low cost steering control system with an electronically controlled steering rate, but which avoids the aforementioned disadvantages of the known mechanical steering control system.

SUMMARY OF THE INVENTION

According to the present invention, there is provided an improved system for steering the front steerable ground wheels and steerable rear caster wheels of a self-propelled agricultural vehicle.

An object of the invention is to provide such a vehicle steering system including a primary steering valve of the known type described above and wherein the leakage characteristic of the steering valve is compensated for without adding undue cost to the system.

A further object of the invention is to provide such a vehicle steering system which includes a manner of automatically hydraulically centering the front steering control cylinder whenever a position sensor for a speed control actuator shows that the ground speed is set to zero and a switch in the hydro handle slot indicates that the hydro handle is in the Park position.

The foregoing objects are achieved in a system which uses an automatic front steering valve, of a type normally provided in conjunction with the manually operated primary steering valve, to supplement the flow of the primary steering valve so as to compensate for the fluid flow lost by leakage. A position sensor on the steering wheel shaft indicates steering wheel movement and turn direction. Whenever steering wheel movement is detected, the automatic front steering valve is used to add fluid to the hydraulic steering circuit in the direction of the indicated turn as a supplement to the fluid from the primary steering valve. This fluid is added as a step function at a volume more or less equal to the steering valve leakage rate, the result in the system being as if the steering valve has zero leakage.

An electric actuator with a position feedback sensor is used for ground speed control. Whenever the actuator position sensor shows that the ground speed is set to zero and a switch in the hydro handle slot shows that the hydro handle is in the Park position, an electrical signal is sent to actuate a normally deactivated "on-off" valve for opening a normally closed fluid path which, by way of an open center of the primary steering valve, interconnects the opposite ports of the front steering control cylinder. Simultaneously actuated is the automatic front steer valve which appropriately provides working fluid to the front wheel steering control cylinder for causing the piston of the steering control cylinder to move to its centered position effecting a neutral (straight ahead) steering condition. The electrical signals for enabling the automatic front steering valve and for energizing the neutral control valve are terminated in response to a sensor that senses when a steering control linkage is in its neutral position.

These and other objects will become apparent from a reading of the ensuing description together with the appended drawings.

DESCRIPTION OF THE PREFERRED EMBODIMENT

Figure 1:
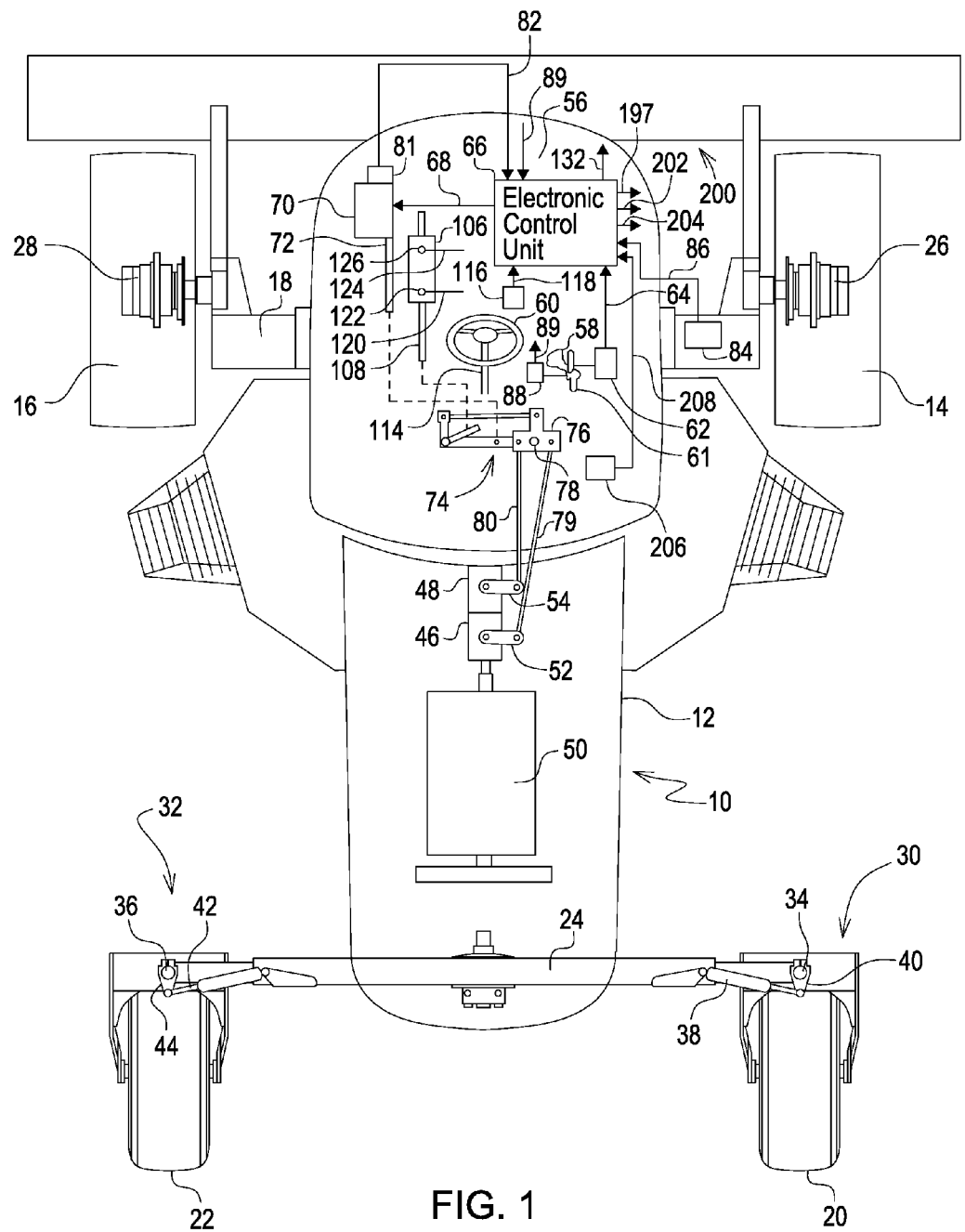
FIG. 1 is a top view of a typical agricultural vehicle of the type with which the steering system of the present invention is particularly adapted for use.

Referring now to FIG. 1, there is shown a self-propelled agricultural vehicle 10, here shown as being the type used for carrying a forward-mounted implement 200 such as a mower-conditioner, for example. The vehicle 10 is shown schematically and includes a frame 12 supported on right- and left-hand front drive wheels 14 and 16, respectively, mounted to opposite ends of a front axle assembly 18, and right- and left-hand rear ground wheels 20 and 22, respectively, mounted to opposite ends of a rear axle assembly 24.

The front drive wheels 14 and 16 are respectively driven by right- and left-hand hydraulic motors 26 and 28 forming part of a dual path hydrostatic transmission and can be caused to be driven at different speeds so that the vehicle 10 may be steered. The rear wheels 18 and 20 are respectively carried by right- and left-hand rear wheel assemblies 30 and 32 having respective spindles 34 and 36 mounted in opposite ends of the rear axle assembly 24 for rotating about upright axes, thereby caster-mounting the wheels. The rear wheels 20 and 22 are steerable about their caster axes so as to assist steering affected by driving the front wheels at different speeds, this steering being affected by a right-hand rear steering assist cylinder 38 connected between the rear axle assembly 24 and a steering arm 40 fixed to an upper end of the spindle 34, and by a left-hand rear steering assist cylinder 42 connected between the rear axle assembly 24 and a steering arm 44 fixed to an upper end of the spindle 36.

The dual path hydrostatic transmission further includes first and second, variable displacement, reversible pumps 46 and 48, respectively, coupled in fluid communication with the motors 26 and 28 by respective pairs of supply/return lines (not shown), as is well known in the art. The pumps 46 and 48 are coupled for being driven by a prime mover, here shown as an internal combustion engine 50 mounted on the frame 12, the engine also providing power for driving other driven components of the vehicle and also of the implement 200. The pumps 46 and 48 include respective swash plates to which displacement control arms 52 and 54 are connected, the arms each being mounted for pivotal movement from a zero displacement neutral position, with increasing forward and rearward movement from neutral respectively affecting increasing displacement and volume of fluid so as to produce increasing forward and reverse driving speeds of the motors 24 and 26.

An operator seated within a cab 56 located on a forward area of the frame 12 can control the speed and direction of travel of the vehicle 10 by manual operation of a hydro-lever 58 located rightward of a steering wheel 60, the hydro-lever acting to initiate forward or rearward movement of the displacement control arms 52 and 54. Specifically, the hydro-lever 58 is mounted for movement along a guide slot 61 having straight fore-and-aft extending front and rear sections offset from each other and joined by a cross-over section, with the displacement control arms 52 and 54 being in corresponding neutral positions when the lever 58 is in the cross over section of the guide slot. A lever position sensor 62 is associated with the lever 58 and generates an electrical speed and direction input signal 64 corresponding to the lever position, and may include information such as whether or not the lever is presently moving, the direction of movement, and the instantaneous speed of movement. The speed and direction input signal is represented by a lead connected to an electronic control unit (ECU) 66, the control unit processing the signal and outputting a proportional speed/direction control signal 68 to an electric linear actuator 70, the signal 68 being represented by the lead connecting the ECU 66 and actuator 70. The actuator 70 has an output rod 72 coupled to one of the links of a schematically shown four-bar linkage 74, this one link carrying a control plate 76 mounted for pivoting about an upright axis 78 relative to the link and being respectively connected to the pump displacement control arms 52 and 54 by motion transfer links 79 and 80. A position feedback sensor 81 is associated with the actuator 70 and generates a feedback signal 82, indicated by the lead connecting the actuator 70 to the ECU 66, is processed by the ECU which operates to de-energize the actuator 70 when it has moved a distance corresponding to the speed signal sent by the lever position sensor 62. The vehicle ground speed is monitored by a ground speed sensor 84 which generates a corresponding ground speed signal 86 that is coupled to the ECU 66 by a lead representing the signal.

Associated with the structure containing the guide slot 61 is a park position switch 88 located for being engaged and operated when the lever 58 is at one end of the cross over section of the guide slot 61, with this operation of the switch sending a Park signal 89 to the ECU 66, indicated by a broken lead coupled between the switch 88 and ECU, acting to automatically engage a parking brake (not shown), in a well-known manner (not disclosed), if the engine 32 is not running.

The vehicle 10 is steered by causing the motors 26 and 28 for driving the front wheels 14 and 16 to be driven at different speeds by moving the displacement control arms 52 and 54 different amounts relative to each other, as is generally known. It is also known to assist this steering of the vehicle by steering the caster-mounted rear wheels 20 and 22, this steering being effected by actuating the right and left rear steering assist cylinders 38 and 40.

Figure 2:
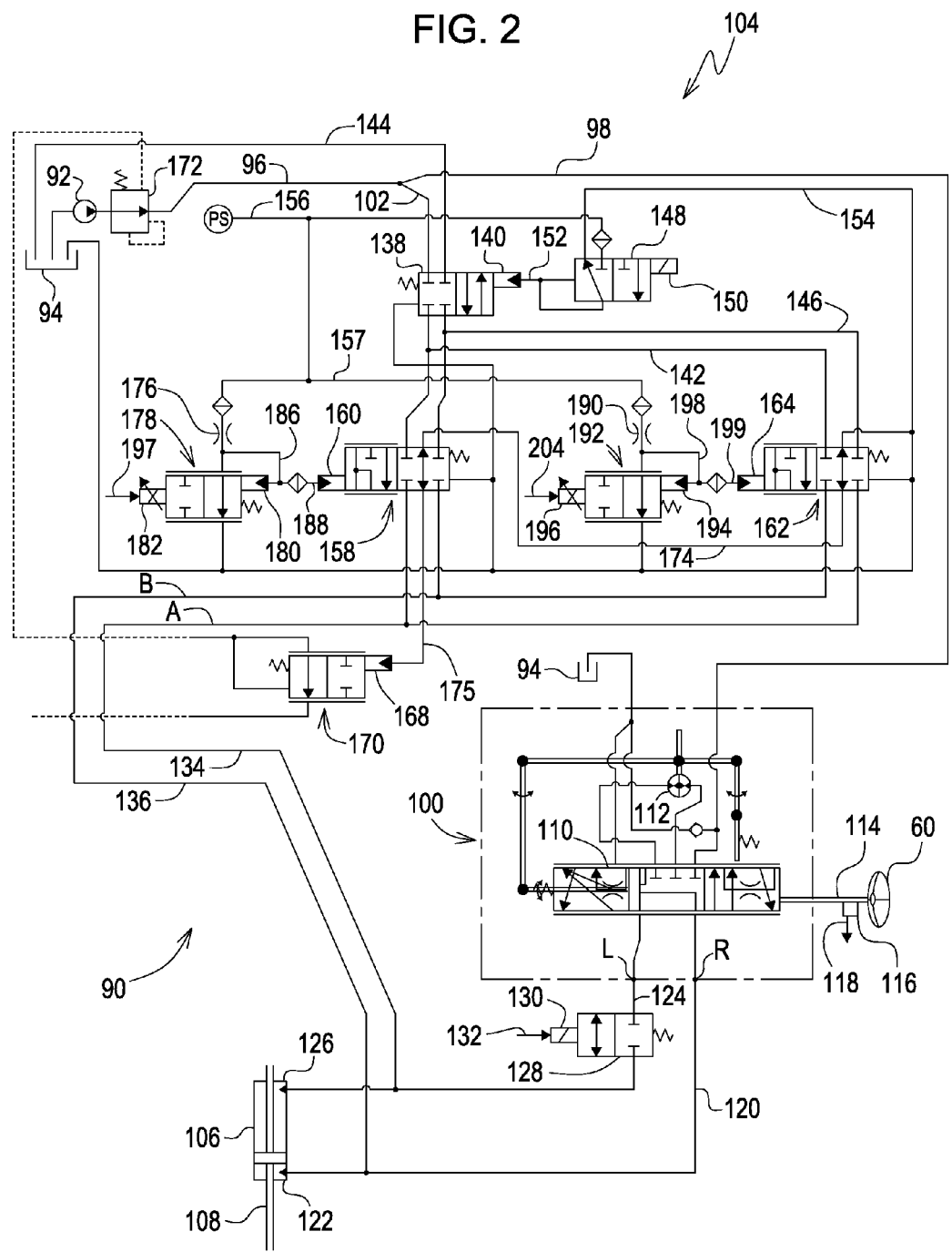
FIG. 2 is a portion of an electro-hydraulic steering control circuit illustrating a primary steering valve, for an agricultural vehicle including steerable front ground wheels, together with an automatic steering control valve for supplementing the fluid supplied by the primary steering control valve.

Referring now also to FIG. 2, there is shown an electro-hydraulic steering control system 90 for controlling the steering operation of the steerable, driven front wheels 14 and 16. The steering control system 90 is configured for varying the steering ratio and to vary the number of lock-to-lock turns of the steering wheel 60, or other type of operator input device, in a relatively precise manner so as to accommodate an operator request and/or to accommodate a variety of operating modes of the vehicle. The steering control system 90 includes a fixed displacement charge pump 92 which draws hydraulic fluid from a sump 94 and delivers relatively low pressure fluid (300 psi, for example) to a branched supply line 96 having a first branch 98 leading to a primary steering valve 100 and a second branch 102 leading to an automatic front steering control valve 104, which is of a type usable with global positioning systems or other systems capable of automatically generating signals useable for steering.

The primary steering valve 100 acts in combination with the automatic front steering valve 104 to control the operation of an extensible and retractable or a double-acting front steering control cylinder 106 having a piston rod 108 coupled to the four-bar-linkage 74 (see FIG. 1) for effecting pivoting of the steering control plate 76 relative to the link which carries it for causing differential movement of the displacement control arms 52 and 54 so as to cause the wheels 14 and 16 to be driven at different speeds to steer the vehicle.

Specifically, the primary steering valve 100 includes a spring-centered, multi-port spool and sleeve fluid control valve 110 that is in fluid communication with a fluid metering gerotor 112, with the operation of the spool and gerotor resulting in a known amount of internal leakage which is specified by the manufacturer so that a customer can choose a steering valve that will produce flows and pressures for meeting desired steering characteristics such as sensitivity and steering rates. Internal leakage of valves of the same design tend to be the same, with total capacity increasing as the size of the valve increases so that larger valves tend to be more responsive or have a quicker steering rate. However, increasing the size of the steering valve adds cost and space requirements for the entire system. Therefore applicants have chosen a steering valve 100 having a capacity less than that required to obtain the desired steering rate, but have created a design, described below, for supplementing the flow produced by the primary steering valve so as to compensate for the fluid output lost because of internal leakage. This design requires that the internal leakage characteristic of the valve 100 be provided as a table or the like which is stored in the ECU 66 for a purpose described below.

The steering wheel 60 is coupled to one end of a steering shaft 114 having an opposite end coupled for effecting operation of the fluid control valve 110. Under normal driving conditions, a rotation of the steering wheel 60 actuates the fluid control valve 110 which ultimately powers rotation of the gerotor 112. A steering input sensor 116 is associated with the steering shaft 114 and generates and transmits an electrical steering input signal 118 to the ECU 66, as indicated by the lead coupling the sensor to the ECU (see FIG. 1). The steering input signal 118, has a purpose explained below, and corresponds to the rotational motion of the steering wheel 60, and may include information such as whether or not the steering wheel 60 is currently rotating, the direction of rotation, and the instantaneous speed of rotation.

The primary steering valve 100 includes a right steering fluid port R and a left steering fluid port L, with the right port R being directly coupled, as by line 120, to a left steering port 122 of the front steering control cylinder 106, and with the left steering fluid port L being coupled, as by a line 124, to a left steering port 126 of the cylinder 106. The line 124 contains a two-position solenoid-operated, neutral centering valve 128, which is normally deactivated and in a blocking or "off" position preventing flow between the steering valve port L and the left steering cylinder port 126, when no steering operation is taking place. A solenoid 130 of the centering valve 128 is coupled for receiving an electrical steering centering or "on" signal 132, indicated by a broken lead extending from the ECU 66 to the solenoid 130, in response to the ECU receiving the steering input signal 118. Thus, assuming that the operator initiates a right turn by turning the steering wheel 60 to the right, the solenoid 130 will receive the "on" signal 132 causing the valve 128 to shift so as to couple the valve port L to the left steering port 126 of the front steering control cylinder 106. At the same time, the steering control valve 110 will shift leftward coupling the fluid supplied by the first branch line 98 to the gerotor, which, in turn is coupled to meter flow to the steering cylinder port 122 by way of the right steering fluid port R and line 120, while coupling the steering cylinder port 126 to sump by way of the line 124, such that the cylinder rod 108 shifts to pivot the control plate 76 causing rightward steering movements of the displacement control arms 52 and 54. A left turn is initiated in a similar manner by turning the steering wheel 60 to the left.

The automatic front steering control valve 104 includes first and second work ports A and B that are respectively coupled to the left and right steering ports 126 and 122 of the front steering control cylinder 106 by supply/return lines 134 and 136. The automatic front steering control valve 104, as shown in FIG. 2, is in a standby condition wherein various valves for selectively controlling the flow of charge pressure fluid to the work ports A and B are in normally deactivated positions.

Specifically, a two-position pilot-operated direction control valve 138 and a solenoid-operated "on-off" valve 148 cooperate to define an enable valve arrangement.

The control valve 138 includes a pilot actuator 140 and is shown in a normally closed position wherein it blocks fluid communication between the branched charge pressure supply line 96 and a branched fluid feed line 142, and also blocks fluid communication between a return line 144 and a branched fluid return line 146.

The solenoid-operated, "on-off" valve 148 includes a solenoid 150 and is shown in a de-energized condition wherein a pilot pressure feed line 152, provided between the pilot actuator 140 of the direction control valve 138 and one end of the "on-off" valve 148, is coupled to a return line 154 while blocking fluid communication between the pilot pressure feed line 152 and a pilot pressure supply line 156 that receives pilot pressure fluid from a pilot pressure source PS.

A proportional left steering control valve arrangement includes a left proportional pilot-operated steering control valve 158 combined with a left proportional, solenoid-operated pilot pressure control valve 178; and a right proportional steering control valve arrangement includes a right proportional pilot-operated steering control valve 162 combined with a right proportional solenoid-operated pilot pressure control valve 192

Specifically, the left and right steering control valves 158 and 162 respectively include pilot actuators 160 and 164. Branched fluid feed line 142 and branched return line 146 each extend from the direction control valve 138 to the left proportional steering control valve 158 and to the right proportional, steering control valve 162. The steering control valves 158 and 162, as shown in FIG. 2, are each in normal deactivated conditions. In the deactivated condition, the left steering control valve 158 blocks fluid communication between the branched supply feed line 142 and the work port A and the branched return feed line 146 and the work port B, noting that the work port A is connected to the left steering port 126 of front steering control cylinder 106 by the supply/return feed line 134 and the work port B is connected to the control cylinder port 122 by the supply/return feed line 136.

Similarly, when the right steering control valve 162 is in the deactivated position, it blocks fluid communication between the supply feed line 142 and the work port B and between the return feed line 146 and the work port A.

Additionally, when the steering control valves 158 and 162 are in their deactivated conditions, the right steering control valve 162 has an open center having an inlet end coupled to the return line 154 and having an outlet connected to an inlet of an open center of the left steering control valve 158 by an interconnecting line 174. An outlet end of the open center of the left steering control valve 158 is coupled to a pilot-pressure feed line 175 that is connected to an actuator 168 of a normally open proportional pressure relief valve 170 that controls pilot pressure coupled to a normally open pressure reducing valve 172. Thus, the pilot actuator 168 of the valve 170 is also connected to the return line 154.

Coupled downstream from a flow restrictor 176 provided in a first leg of a pilot-pressure feed line 157 branched from the pilot pressure supply line 156 is the left proportional, solenoid-operated pilot fluid control valve 178, which has a pilot actuator 180 at one end, and a solenoid 182 for receiving a variable electric current at another end. The valve 178 is in a normally open position wherein it connects the pilot pressure feed line 156 to the return line 154. A location of the first leg of the pilot pressure feed line 157 that is between the restrictor 176 and the valve 178 is connected to one end of a line 186 having a second end coupled to a line 188 interconnecting the pilot actuator 160 of the left steering valve 158 and the pilot actuator 180 of the pilot pressure control valve 178.

Similarly, coupled downstream from a flow restrictor 190 provided in a second leg of the pilot pressure feed line 157 is the right proportional, solenoid-operated pilot pressure control valve 192 having a pilot actuator 194 at one end and having a solenoid 196 at another end for receiving a variable electric current. The normally open valve 192 connects the pilot fluid feed line 157 to the return line 154. Connected to the second leg of the pilot pressure feed line 157 at a location between the flow restrictor 190 and the valve 192 is one end of a branch 198 having a second end coupled to a pilot pressure feed line 199 interconnecting the pilot actuator 164 of the right steering valve 162 and the pilot actuator 194 of the pilot pressure control valve 192.

During steering operation performed by turning the steering wheel 60, the ECU 66 will send, depending on the direction of steering, either a left steering control signal to the solenoid 182 of the left proportional flow control valve 178 or a right steering control signal to the solenoid 196 of the right proportional flow control valve 192, these steering control signals being proportional to the sensed ground speed signal 118 received by the ECU 66, and also being proportioned to result in the quantity of working fluid metered through the left or right steering control valves 158 or 162 for use in actuating the front steering control cylinder 106 to be such as to make up for the amount of specified or expected internal leakage of the primary steering valve 100 provided as stored information in the ECU 66.

Specifically, assuming the operator desires to turn the vehicle 10 to the left, the steering wheel 60 will be turned to the left causing the primary steering valve 100 to be actuated by the steering shaft 114 so as to cause the control valve 110 to be operated to connect the charge pressure supply branch line 96 to the left steering work port L. At the same time, the steering input sensor 116 will send a signal to the ECU 66, which in turn will send the electrical "on" signal 132 to the solenoid 130 of the neutral centering valve 128, shifting the valve 128 so as to couple the left steering work port L to the left steering port 126 of the front steering control cylinder 106.

At the same time, the fluid flowing through the primary steering valve 100 to the front steering control cylinder 106 will be supplemented by operation of the automatic steering valve 104. This operation is initiated, simultaneously with sending the "on" signal 132 to the valve 128, by the ECU 66 sending an enable signal 202 to the solenoid 150 of the "on-off" valve 148 for enabling operation of the automatic steering valve 104, and will send a proportional control signal 197 to the solenoid 182 of the proportional pilot pressure flow control valve 178, this latter control signal acting to vary the amount of supplemental fluid as a function of the ground speed of the vehicle 10 as determined by the ground speed signal 86 sent to the ECU 66 by the ground speed sensor 84.

Activation of the "on-off" valve 148 will result in the valve 148 shifting so as to connect the pilot pressure supply line branch 156 to the feed line 152, thereby pressurizing the pilot actuator 140 of the direction control valve 138 causing the latter to shift so that working fluid supplied by the charge pump 92 is made available to the left and right steering control valves 158 and 162. Upon the solenoid 182 of the proportional pilot pressure flow control valve 178 being actuated, the normally open valve 178 will shift to block a proportional amount of pilot pressure fluid from passing to the return line 154. Due to the restrictor 190, pressure will rise in the branch line 186 and pilot pressure feed line 188 causing the left steering valve 158 to shift rightward connecting a proportional amount of working fluid supplied by the line 142 to the work port A and also to pilot pressure feed line 175 leading to the pilot actuator 168 of proportional pressure relief valve 170. Work port A is coupled, by means of feed line 134, to the left steering port 126 of the front steering control cylinder 106, thereby supplementing the fluid arriving from the left steering port L of the primary steering valve 100. The amount of fluid added will be that required for making up for normal leakage through the primary steering valve 100 so that the primary steering valve can be selected to be as small as possible and still supply sufficient steering fluid for the vehicle application.

Steering operation for turning the vehicle 10 to the right is similar to that just described except that a proportional electrical signal 204 is provided for actuating the control valve 192 instead of the signal 197 being sent for actuating the control valve 178, with the result that the right steering valve 162 is shifted rightward so as to connect the work port B to the right steering port 122 of the front steering control cylinder 106, noting that the primary steering fluid control valve 110 will now also be supplying fluid to the right steering port 122.

Another function of the automatic steering control valve 104 is to center the steering control cylinder 106 when no steering signal is being received. Centering operation is initiated by the ECU 66 simultaneously sending an enable or "on" signal to the solenoid 150 of the enable valve 148 and sending the "on" signal to the solenoid 130 of the centering valve 128 in response to the position sensor 81 of the electric linear actuator 70 showing that the ground speed is set to zero and the switch 88 in the hydro-handle guide slot 61 showing that the hydro-lever 58 is in the Park position. The enable signal sent by the ECU 66 energizes the enable valve 148 causing it to shift leftward and couple the pilot pressure source PS to the pilot actuator 140 of the direction control valve 138 causing the latter to shift leftward, thereby connecting the fluid supply line 102 to each of the left and right steering control valves 158 and 162 by way of the branched feed line 142, just the same as for the above described steering operation. Also as described above, the signal 132 energizes the centering valve 128 causing it to shift rightward so as to couple the left steering port 126 of the front steering control cylinder 106 in fluid communication with the left steering work port L, which, in turn, is coupled, by way of the open centered steering valve 110 to the right steering work port R and thus to the right steering port 122 of the steering control cylinder 106. Thus, the cylinder ports 122 and 126 are now coupled in fluid communication with each other.

Depending on the position of the steering control plate 76 of the four-bar linkage 74, as determined by a position sensor 206 which sends a plate position signal 208 to the ECU 66, the ECU will send a control signal to one or the other of the right and left steering control valves 158 or 162. For example, in the event that the position signal received by the ECU 66 indicates that the steering control plate 76 is pivoted for causing a right turn, the ECU will send a control signal to the solenoid 182 of the valve 178 so that the valve 178 shifts to block the pilot pressure fluid supply line 175 from the return line 184. Due to the restrictor 190, the pilot pressure will rise in the lines 186 and 188, causing the left steering control valve 158 to shift rightward so as to couple the supply pressure line 142 to the port A to send pressure to the steering cylinder port 126, causing the piston rod 108 to be shifted downwardly, in FIG. 2, so as to center the piston within the steering cylinder 106, resulting in the steering control plate 76 being moved to its neutral position. The return of the steering control plate 76 to its neutral position will be sensed by the position sensor 206, with the corresponding signal being received by the ECU 66 resulting in the ECU terminating the enable signal sent to the enable valve 148, the control signal sent to the solenoid 182 of the proportional direction control valve 178 and the "on" signal sent to the centering valve 128 so that the automatic steering control valve 104 and centering valve 128 return to their deactivated conditions.

In the event that the position signal received by the ECU 66 indicates that the steering control plate 76 is pivoted for causing a left turn, the ECU will send a signal to the solenoid 196 of the direction control valve 192 so that the valve 192 shifts rightward to block the pilot pressure fluid supply line 191 from the return line 184. Due to restrictor 176, the pilot pressure in lines 198 and 199 will rise resulting in the right steering control valve 162 shifting rightward so as to couple the fluid pressure supply line 142 to the port B to send fluid pressure to the steering cylinder port 122 causing the piston rod 108 to move upwardly, in FIG. 2, so as to center the piston in the cylinder 106, noting that the right and left steering ports 122 and 126 are now coupled in fluid communication with each other by way of the open center of the valve 110 of the primary steering control valve 100. Again, the position sensor 206 will sense the return of the steering control plate 76 to its neutral position and will provide the ECU 66 with a corresponding signal, the ECU then acting to terminate the enable signal sent to the enable valve 148, resulting in the pilot pressure being removed from the valve 138 permitting it to move to its normally closed position. The ECU 66 also terminates the control signal 204 to the right proportional pilot pressure control valve 192 so that the valve 192 returns to its normally open position connecting pilot pressure to the sump 94.

Figure 3A:
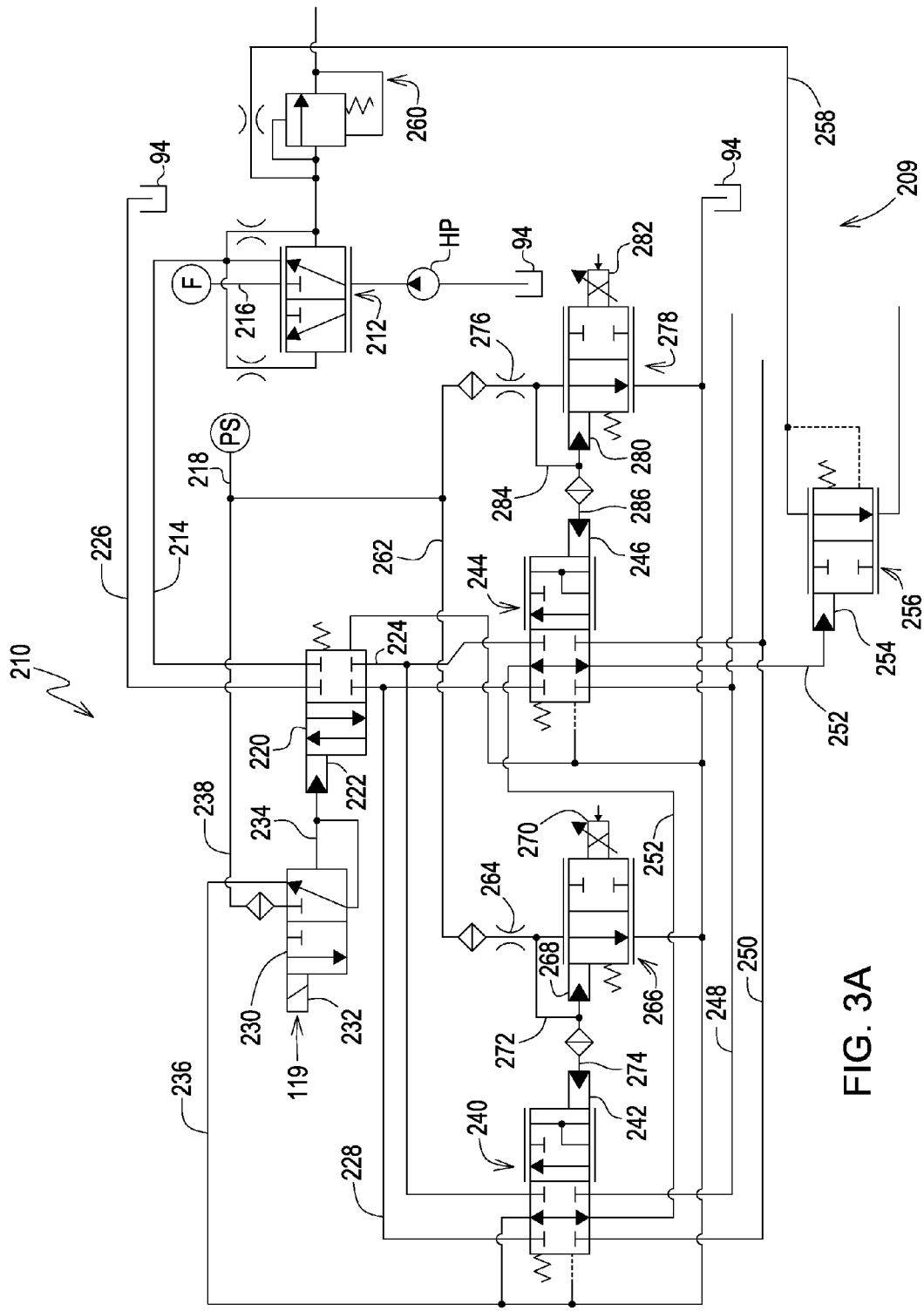
FIG. 3A illustrates an automatic electro-hydraulic rear steer control valve forming a portion of a rear steering assist system used in conjunction with the electro-hydraulic steering control system illustrated in FIG. 2 and operable for providing working fluid to the right and left steering assist cylinders illustrated in FIG. 1 for steering right and left caster wheels.
Figure 3B:
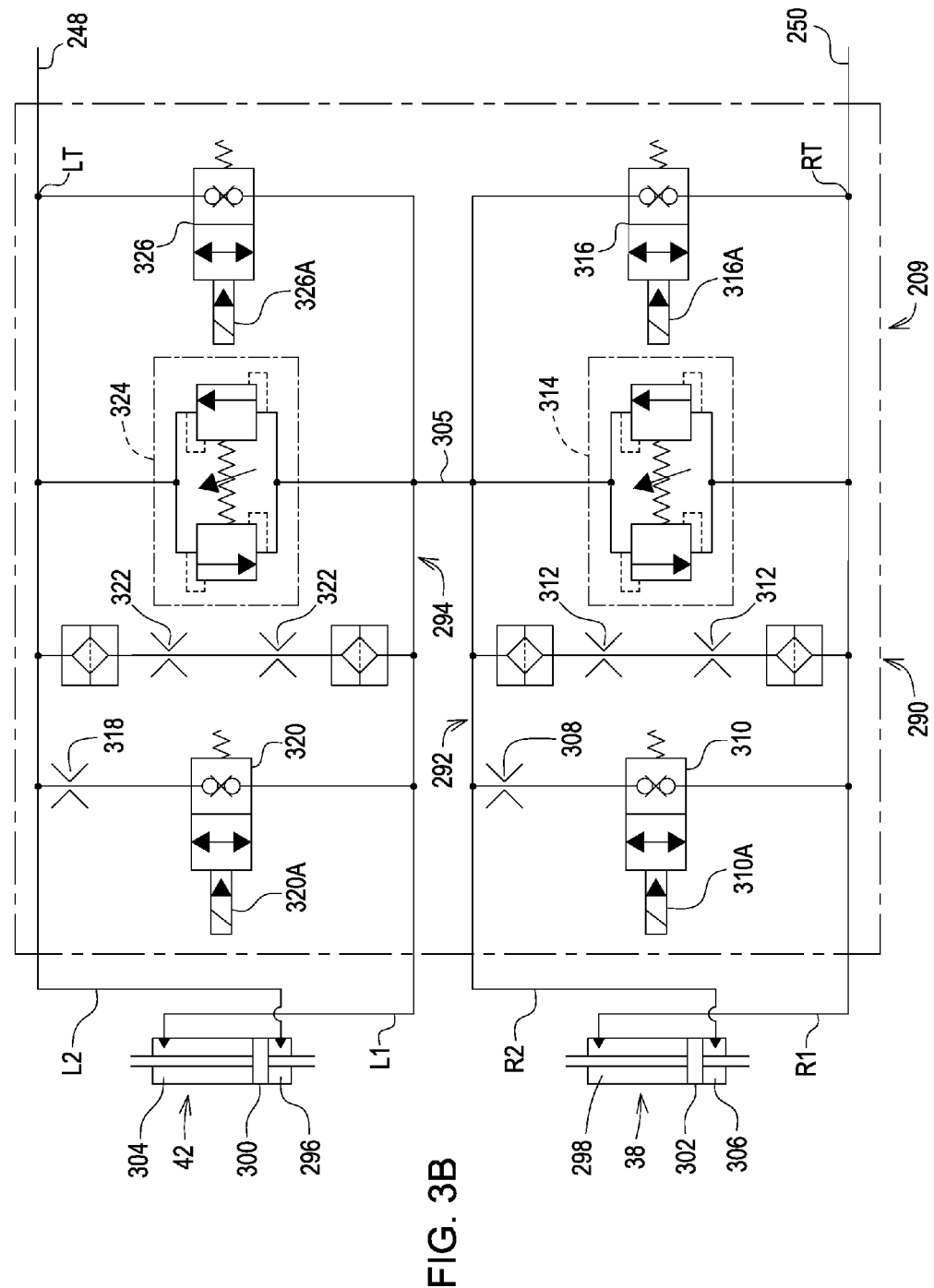
FIG. 3B illustrates an electro-hydraulic rear steer valve forming a further portion of the rear steering assist system and operable for routing the working fluid received from the automatic rear steer control valve to the right and left steering assist cylinders illustrated in FIG. 1.

Referring now to FIGS. 3A and 3B, there is provided an electro-hydraulic rear assist steering system 209 including an automatic rear steer assist control valve 210 for supplying working fluid to a rear steer valve 290, with the valve 290 including right and left valve sections 292 and 294, respectively, coupled for controlling the operation of the right and left rear steering assist cylinders 38 and 42.

A high pressure pump HP is coupled for delivering high pressure fluid (3,000 psi, for example) to the rear steer control valve 210 by way of a proportional flow divider 212 having an inlet coupled to the pump HP and having one outlet coupled to the control valve 210 by a pressure fluid supply line 214 and another outlet coupled to other functions F of the vehicle 10 by a supply line 216. The flow divider 212 is normally biased to a position wherein the pump HP is coupled to the line 214. The pilot pressure source PS is coupled to the automatic rear steering control valve 210 by a branched pilot pressure supply line 218.

The automatic rear steer assist control valve 210, as shown in FIG. 3A, is in a standby condition wherein various valves for selectively controlling the flow of high pressure fluid to right and left work ports RT and LT, respectively, of the rear steer valve sections 292 and 294 are in normally deactivated positions. Specifically, an automatic rear steering assist enabling valve arrangement comprises a two-position pilot-operated direction control valve 220 and a solenoid-operated "on-off" or enabling valve 230.

The direction control valve 220 includes a pilot actuator 222 and is in a normally closed position wherein it blocks fluid communication between the pressure fluid supply line 214 and a branched fluid feed line 224, and also blocks fluid communication between a return line 226 and a branched fluid return feed line 228.

The solenoid-operated, enable or "on-off" valve 230 includes a solenoid 232 and is shown in a de-energized condition wherein a pilot pressure feed line 234, provided between the pilot actuator 222 of the direction control valve 220 and one end of the "on-off" valve 230, is coupled to a return line 236 while blocking fluid communication between a pilot pressure supply line 238 coupled to the pilot pressure source PS.

The branched pressure fluid feed line 224 and branched return feed line 228 each extend from the direction control valve 220 to a proportional, left steering valve arrangement comprising a pilot-operated left rear steering control valve 240 and a proportional left pilot fluid flow control valve 266, and to a proportional, right steering valve arrangement comprising a pilot-operated right rear steering control valve 244 and a proportional right pilot fluid flow control valve 278.

The pilot-actuated left steering control valve 240 includes a pilot actuator 242 and the pilot-operated right steering control valve 244 includes a pilot actuator 246. The steering control valves 240 and 244 are each in normal deactivated conditions.

In the deactivated condition, the left steering control valve 240 blocks fluid communication between the branched supply feed line 224 and a branched feed line 248 coupled to an inlet port LT (see FIG. 3B) of the rear steer valve section 294 and blocks fluid communication between the branched return feed line 228 and a branched feed line 250 coupled to an inlet port RT of the rear steer control valve section 292.

Similarly, when the right rear steering control valve 244 is in the deactivated position, it blocks fluid communication between the supply feed line 224 and the branched feed line 250 connected to the inlet port RT of the rear steer control valve section 284 and blocks fluid communication between the return feed line 228 and the branched feed line 248 coupled to the inlet port LT.

Additionally, when the left and right steering control valves 240 and 244 are in their deactivated conditions, the steering control valve 240 has an inlet end of an open center coupled to the return line 236, and has an outlet end connected to an inlet of an open center of the right steering control valve 244 by a pilot-pressure feed line 252, with the outlet of the open center of the valve 244 being connected to a pilot actuator 254 of a normally open proportional pressure relief valve 256 that controls pilot pressure coupled, as by a pilot pressure line 258, to a normally closed pressure reducing valve 260 associated with the proportional flow divider 212.

A branched pilot pressure feed line 262 is coupled to the pilot pressure supply line 238. Coupled to one branch of the feed line 262 just downstream from a first restrictor 264 is the normally open, pilot-operated, proportional left pilot pressure control valve 266 having a pilot actuator 268 at one end and having a solenoid 270, at another end, for receiving a variable electric current. The normally open valve 266 connects the pilot pressure feed line 262 to the return line 236. The first branch of the pilot pressure feed line 262 includes a further branch line 272 having one end connected to the first branch of the feed line 262, at a location between the restrictor 264 and the valve 266, and having a second end coupled to a line 274 interconnecting the pilot actuator 242 of the left steering valve 240 and the pilot actuator 268 of the valve 266.

Similarly, coupled in a second branch of the pilot pressure feed line 262 just downstream from a second flow restrictor 276 is the normally open, pilot-operated, proportional right pilot pressure flow control valve 278 having a pilot actuator 280 at one end and, at another end, having a solenoid 282 for receiving a variable electric current. The normally open valve 278 connects the pilot fluid feed line 262 to the return line 236. Connected to the second branch of the feed line 262 at a location between the restrictor 276 and the proportional flow control valve 278 is one end of a further branch line 284 having a second end coupled to a line 286 interconnecting the pilot actuator 246 of the right rear steering valve 278 and the pilot actuator 280 of the valve 282.

As with the operation of the automatic steering control valve 104, the operation of the automatic rear steer assist control valve 210 begins with the operator manually turning the steering wheel 60 resulting in the steering input sensor 116 generating the input signal 118 that is sent to the ECU 66, which in turn sends an enable signal 119 to the "on/off" valve 230 causing it to shift rightward (FIG. 3A) so as to connect the pilot pressure source PS to the pilot actuator 222 of the control valve 220 by way of the pilot pressure supply line 238 and feed line 234. The pilot pressure shifts the valve 220 rightward so as to connect the source of high pressure fluid HP to the right and left rear steering control valves 244 and 240 by way of the supply line 214 and branched feed line 224.

Assuming the steering wheel 60 is being turned for causing a right turn, the steering input sensor 116 will also provide a signal with information regarding the direction and speed of turning to the ECU 66 which uses this signal together with a ground speed signal 86, and perhaps other stored information, to arrive at a proportional steering control signal that is applied to the variable solenoid 282 of the right pilot fluid flow control valve 278. This causes the valve 278 to shift leftward (FIG. 3A) and restrict a proportionate amount of pilot fluid flow being fed to the valve 278 by the supply line 238 and branched feed line 262 from going to the return line 236. Due to the restrictor 264, pilot fluid pressure will rise in the branch line 284 and connection line 286 and cause the right rear steering control valve 244 to shift leftward so as to connect the high pressure fluid contained in the feed line 224 to the fluid output/return line 250, which is connected to the right steer work port RT of the rear steer valve section 292, with the output/return line 248 being coupled to the sump 94 by way of the branched line 228, valve 220 and return line 226. The signals energizing the solenoids of the enable valve 230 and the pilot fluid control valve 278 will be terminated by the ECU 66 when feedback signals received by the ECU 66 indicate that desired turn initiated by turning the steering wheel 60 has been accomplished.

Similarly, if the steering wheel 60 is turned for initiating a left turn, the steering input sensor 116 will provide a signal with information regarding the direction and speed of turning to the ECU 66 which uses this signal together with a ground speed signal 86, and perhaps other stored information, to arrive at a proportional steering control signal that is applied to the variable solenoid 270 of the left pilot fluid flow control valve 266. This causes the valve 266 to shift leftward (FIG. 3A) and restrict a proportionate amount of pilot fluid flow being fed to the valve 278 by the supply line 238 and branched feed line 262 from going to the return line 236. Due to the restrictor 276, pilot fluid pressure will rise in the branch line 272 and connection line 274 and cause the left rear steering control valve 240 to shift leftward so as to connect the high pressure fluid contained in the feed line 224 to the fluid output/return line 248, which is connected to the left steer work port LT of the rear steer valve section 294, with the output/return line 250 being coupled to the sump 94 by way of the branched line 228, valve 220 and return line 226. The signals energizing the solenoids of the enable valve 230 and the pilot fluid control valve 266 will be terminated by the ECU 66 when feedback signals received by the ECU 66 indicate that desired turn initiated by turning the steering wheel 60 has been accomplished.

It is noted that the fluid output/ lines 248 and 250 respectively coupling the rear steer valve 210 to the left and right ports LT and RT, respectively of the second and first sections 294 and 292 of the rear steer valve 290 are respectively coupled to inner chambers 296 and 298 of the left and right turn assist steering cylinders 42 and 38 by lines L2 and R1, whereby a pressure differential on opposite sides of left and right pistons 300 and 302, respectively, exists during turning operation. This pressure differential causes a biasing or turn assist force to be applied to the wheels 20 and 22.

The two rear steering assist cylinders 38 and 42 are coupled in series with each other and each steering assist cylinder 38 and 42 is fluidly coupled with a number of valves and orifices, each of which can be separate from or integrally formed with a corresponding steering assist cylinder. For example, hydraulic pressure input fluid supplied by the line 248 to the left work port LT of the rear steer valve 290 will be connected by the line L2 to pressurize the inner chamber 296 of cylinder 42 and move the piston 300 outwardly so as to force fluid from an outer chamber 304 into a line L1, which is coupled to the line R2 of the valve section 292 by a connecting line 305. From the line R2, the pressure fluid is forced into the outer chamber 306 of the right steering assist cylinder 38 so as to move the piston 302 inwardly and force fluid into a line R1.

The vehicle 10 is configured to provide two speed ranges, namely a field range providing a maximum forward speed of about 12 mph, and a transport range providing a maximum forward speed of about 25 mph. A first low speed field orifice 308 and an "on/off" field valve 310 are coupled in series with each other across the lines R1 and R2. Coupled across the lines R1 and R2 in series with each other and in parallel with the orifice 308 and field valve 310 is a pair of higher speed orifices 312, with a high pressure relief valve 314, and a direction change valve 316 being coupled in parallel with each other across the lines R1 and R2.

Similarly, connected across the lines L1 and L2 of the left steering valve section 294 are a second low speed field orifice 318 and second "on/off" field valve 320, a second pair of higher speed orifices 322, a second high pressure relief valve 324, and a second direction change valve 326.

The first and second pairs of transport orifices 312 and 322, respectively, are always in an open state and allow fluid to flow across the pistons 302 and 300 regardless of the ground speed or selected speed range of the vehicle 10, such that each caster wheel 20 and 22 can independently move and align itself with the position required by the dual-path hydrostatic system associated with the primary drive wheels. The first and second pairs of orifices 312 and 322 are sized relative to the primary hydraulic steering valve 100 such that caster wheel position corrections are allowed, but steering inputs from the automatic rear steer valve 210 are obeyed.

In the embodiment shown, the pairs of transport orifices 312 and 322 are two-way orifices having a diameter of approximately 0.035 inch. The pairs of transport orifices 312 and 322 may be selected with a different diameter, dependent upon the specific application. A smaller orifice will allow more precise control from the rear steer valve 290 but will not self-align to the dual-path system as readily.

The field valves 310 and 320 respectively include integral solenoids 310A and 320A. In the embodiment shown, the field valves 310 and 320 are normally deactivated and closed. When the field valves are activated, flow between the lines R1 and R2 is permitted through the orifice 308, and flow between the lines L1 and L2 is permitted through the orifice 318. Each of the orifices 308 and 318 has a diameter of approximately 0.041 inch. The solenoids 310A and 320A are each coupled to the ECU 66 and receive an activating control signal when the ECU 66 is receiving a signal from the ground speed sensor 84 which indicates that the ground speed is at or below a first threshold value (e.g., a typical working speed at or below approximately 12 mph). Thus, when the ground speed is at or below the first threshold speed, the pairs of field valves 310 and 320 are open to allow fluid to flow more freely from one end to the other of the cylinders 38 and 42 than occurs when the vehicle speed is in the transport range. This allows each caster wheel 20 and 22 to turn with less hydraulic resistance regardless of inputs from the rear steer control valve 210, so that spin turns and maneuverability are enhanced.

High pressure relief valves 314 and 324 may be of a conventional design and are configured to open above a predetermined fluid pressure so as to allow fluid flow in either direction and in essence are safety valves that allow the caster wheels 20 and 22 to turn regardless of the steering turn bias input, such as turns at the end of the field, etc. In the embodiment shown, high pressure relief valves 314 and 324 are set to open at a pressure of approximately 1100 psi.

Machine direction valves 316 and 326 respectively include solenoids 316A and 326A and are normally deactivated and closed. The solenoids 316A and 326A of the direction valves 316 and 326 are energized by a signal from the ECU 66 when the ECU receives a speed signal indicating the vehicle 10 is operating at a low speed. Thus, in the event that the machine direction changes from forward to reverse, or vice-versa, and causes a conflict between hydraulic fluid inputs and ground inputs to the caster wheels 20 and 22 during the transition, as the caster wheels spin from one direction to the other, the opening of the direction valves 316 and 326 will result in a free path for fluid to flow from one end to the other of the steering cylinders 38 and 42. Once the speed increases above the low speed threshold, the ECU 66 will terminate the activating control signal, permitting the direction valves to return to their normally closed positions.

The steering operation of the vehicle 10 is thought to be evident from the foregoing, suffice it to say that, by making use of the automatic steering control valve 104, which corresponds to automatic steering control valves provided for use with global positioning systems currently used on many modern vehicles, it is possible to augment the steering fluid output by the primary steering valve 100 so as to make up for normal internal leakage, thereby making it possible to use a primary steering valve which is smaller in size saving cost related to the primary steering valve and any associated components which must be sized larger for use with larger steering valves. Also, by providing a separate automatic rear steer control valve 210 it is possible for supplying a high pressure (for example, approximately ten times the pressure for operating the steering of the front wheels) for operating the rear steering assist cylinders 38 and 42 to overcome the high resistance to the turning movement of the caster wheels 20 and 22 in field conditions.

Further it will be appreciated that whenever the electric linear actuator 70, which is used for ground speed control, is in a position showing that the ground speed is set to zero and the switch 88 is actuated for indicating that the hydro-handle is in its Park position, the automatic steering control valve 104 is activated to control operation of the steering control cylinder 106 to move the displacement control levers 52 and 54 into neutral positions, this position being determined by the sensor 206 associated with the pivot shaft 78 of the control plate 76. This operation will stop any movement of the vehicle caused by a steering input and will also position the displacement control levers 52 and 54 to enable the neutral start sequence if the vehicle engine 50 is stopped and restarted.

Having described the preferred embodiment, it will become apparent that various modifications can be made without departing from the scope of the invention as defined in the accompanying claims.

The invention claimed is:

1. In a vehicle having: a front pair of hydrostatically driven ground wheels, in which steering is accomplished by applying differential hydraulic flow to respective hydraulic drive motors coupled to the front pair of driven ground wheels, a pair of hydraulic pumps respectively coupled for supplying hydraulic fluid to the drive motors and including first and second displacement control levers, a double-acting front steering control cylinder having a piston rod coupled to a linkage including a selectively translatable and pivotal steering control plate coupled to the first and second displacement control levers for controlling the displacements of the pair of hydraulic pumps, a hydro-lever selectively movable from a neutral, Park, position for initiating forward and reverse driving speeds of the vehicle, a primary steering valve coupled for receiving steering inputs from a shaft operated by a steering wheel and having right and left steering fluid ports respectively coupled to right and left steering ports of the double-acting front steering control cylinder for actuating the steering cylinder piston rod for effecting pivotal movement of the control plate, with the primary steering valve having an internal leakage characteristic resulting in a specified, predetermined internal leakage of pressure fluid when actuated for supplying such pressure fluid to one or the other of the right and left steering fluid ports, a steering control arrangement comprising:

an electronic control unit (ECU);

a front steering input sensor coupled for sensing a steering input transmitted to the primary steering valve from the steering wheel and for generating a front steering input signal corresponding to the sensed steering input, with this steering input signal being coupled to the ECU;

a vehicle speed sensor coupled for sensing forward ground speed of the vehicle and for generating a corresponding vehicle ground speed signal, with this ground speed signal being coupled to the ECU;

an electro-hydraulic, automatic front wheel steering control valve coupled for selectively providing steering control fluid to first and second ports of the steering control cylinder and including a normally deactivated, electrically responsive enable valve arrangement electrically coupled to said ECU, and normally deactivated electrically responsive, right and left proportional front steering control valve arrangements electrically coupled to said ECU; and said ECU being operable for processing the steering input signal, the vehicle ground speed signal and the information relating to said amount of leakage, and for sending an enable signal to the enable valve arrangement and for selectively sending one of a proportional right steering signal or a proportional left steering signal to that one of the right and left proportional steering control valve arrangements corresponding to the direction of steering indicated by the steering input signal, thereby causing said one of the right and left proportional steering control valve arrangements to supply an amount of actuating fluid to the double-acting front steering control cylinder which is approximately equal to the specified, predetermined internal leakage of the primary steering valve.

2. The vehicle, as defined in claim 1, and further including: a normally deactivated, electrically responsive centering valve located in one of said right and left steering control lines and blocking fluid communication between the primary steering valve and the double-acting front steering control cylinder when deactivated; and said ECU being electrically coupled to said centering valve and operable in response to receiving said steering input signal for sending an activating signal to the centering valve for causing the later to shift to an activated position wherein fluid communication between the primary steering valve and the double-acting front steering control cylinder is permitted through the one of the right and left steering fluid lines containing the neutral centering valve.

3. The vehicle as defined in claim 2, and further including:
   said primary steering valve having an open center connecting the left and right steering ports to each other when no input is being received from the steering wheel;
   an electric ground speed actuator coupled to said linkage and being operable for imparting translating movement to said control plate so as to effect changes in the positions of the first and second displacement control levers to thereby effect changes in ground speed;
   an actuator position sensor coupled to the ground speed actuator and being operable for generating an electrical actuator position signal, with the actuator position signal being connected to the ECU;
   a steering position feedback sensor being associated with said control plate for generating an electrical feedback signal representing the pivotal position of said control plate, with the feedback signal being connected to said ECU;
   a Park position sensing switch for sensing when the hydro-lever is in the Park position and generating a Park signal, with the Park signal being connected to the ECU; and
   said ECU being operable for processing the actuator position signal, feedback signal and the Park position signal and for acting in response to the actuator position signal indicating that the ground speed is set to zero and the Park signal indicating that the hydro- lever is in the Park position for sending the enabling signal to the enable valve arrangement, sending the proportional steering signal for energizing the appropriate one of the right and left proportional steering valve arrangements for causing steering fluid to be sent to the double-acting front steering control cylinder for causing the cylinder piston to be returned to its centered position, and for sending the activating signal to said centering valve so as to permit the front steering cylinder piston to move to the neutral, straight ahead position, with the ECU terminating the enabling, proportional steering and activating signals in response to the steering position feedback signal indicating that the double-acting front steering control cylinder has arrived at its centered position.

4. The vehicle, as defined in claim 1, and further including a rear steering assist control including:
   right and left rear caster wheels;
   right and left rear steering assist cylinders being respectively coupled for effecting swiveling movement of said right and left rear caster wheels, with each of the right and left steering assist cylinders including inner and outer ports;
   a normally deactivated, electro-hydraulic, automatic rear steer assist control valve including an enable valve arrangement including an electrically responsive enable device coupled to the ECU for receiving an enable signal, and including normally deactivated proportional right and left rear steer assist valve arrangements respectively including right and left electrically responsive devices coupled for automatically, respectively receiving proportional right and left rear steer assist signals from said ECU for automatically selectively providing right and left rear steering fluid outputs which are proportionally related to said right and left rear steer assist signals;
   a rear steer assist valve comprising a right valve section for controlling the right rear steering cylinder, and a left valve section for controlling the left rear steering cylinder, with the right valve section including a right port coupled between the right steering fluid output of right rear steer assist valve arrangement and the inner port of the right steering assist cylinder, and with the left valve section including a left port coupled between the left steering fluid output of the left rear steer assist valve arrangement and the inner port of the left steer assist cylinder, and further with the outer ports of each of the right and left steering assist cylinders being coupled to each other; and
   said ECU being operable for processing the steering input signal, the vehicle ground speed signal and the information relating to said normal amount of leakage, and for sending the enable signal to the enable valve arrangement the proportional rear assist steering signal to that one of the right and left proportional steering control valve arrangements corresponding to the direction of steering indicated by the steering input signal, thereby causing said one of the right and left proportional steering control valve arrangements to correspondingly supply one of the right and left steering fluid outputs respectively to the right and left valve sections of the rear steer assist valve.

\* \* \* \* \*